United States Patent
Onishi et al.

[15] 3,665,062
[45] May 23, 1972

[54] PREPARATION OF CONJUGATED DIENE POLYMERS USING ATE-COMPOUND CATALYSTS

[72] Inventors: Akira Onishi; Ryota Fujio; Minoru Kojima, all of Tokyo, Japan

[73] Assignee: Bridgestone Tire Company Limited, Tokyo, Japan

[22] Filed: Sept. 8, 1969

[21] Appl. No.: 856,170

[30] Foreign Application Priority Data

Sept. 16, 1968 Japan......................................43/66127

[52] U.S. Cl.............................260/84.1, 260/5, 260/80.7, 260/82.1, 260/94.3, 260/880 B
[51] Int. Cl...........................................................C08f 1/74
[58] Field of Search......................260/80.7, 82.1, 84.1, 94.3

[56] References Cited

UNITED STATES PATENTS

| | | | |
|---|---|---|---|
| 3,162,621 | 12/1964 | Enk et al................................ | 260/82.5 |
| 3,202,644 | 4/1965 | Yancey.................................. | 260/93.7 |
| 3,202,645 | 8/1965 | Yancey.................................. | 260/93.7 |
| 3,277,070 | 10/1960 | Weynbergh et al.................... | 260/94.9 |
| 3,365,432 | 1/1968 | Mackenzie et al..................... | 260/82.5 |

*Primary Examiner*—Joseph L. Schofer
*Assistant Examiner*—Stanford M. Levin
*Attorney*—Stevens, Davis, Miller & Mosher

[57] ABSTRACT

Conjugated diene polymers having a microstructure consisting of about 70% of trans-1,4-structure, about 20 percent of cis-1,4-structure and about 10 percent of 1,2- or 3,4-structure is prepared by polymerizing (1) at least one conjugated diene or (2) a mixture of a conjugated diene and a vinyl-substituted aromatic hydrocarbon by using an "Ate-compound" catalyst having the following general formula $$M^1 M^2 R^1 R^2 R^3 R^4$$

wherein $M^1$ is calcium, strontium or barium, $M^2$ is zinc or cadmium, and $R^1$, $R^2$, $R^3$, and $R^4$ are aliphatic, cycloaliphatic or aromatic hydrocarbon radicals containing from 1–10 carbon atoms.

8 Claims, No Drawings

PREPARATION OF CONJUGATED DIENE POLYMERS USING ATE-COMPOUND CATALYSTS

The present invention relates to a process for preparing conjugated diene polymers which comprises contacting a monomeric material selected from the group consisting of (1) at least one conjugated diene and (2) a mixture of a conjugated diene and a vinyl-substituted aromatic hydrocarbon with a catalyst (hereinafter abridged as an "Ate-compound" catalyst) having the following general formula $$M^1M^2R^1R^2R^3R^4$$

wherein $M^1$ is a member selected from the group consisting of calcium, strontium and barium, $M^2$ is a member selected from the group consisting of zinc and cadmium, and $R^1$, $R^2$, $R^3$ and $R^4$ are hydrocarbon radicals selected from the group consisting of aliphatic, cycloaliphatic and aromatic radicals containing from one to ten carbon atoms.

The term "conjugated diene polymers" used herein means homopolymers of a conjugated diene, copolymers of two or more different conjugated dienes and copolymers of a conjugated diene and a vinyl-substituted aromatic hydrocarbon.

It has been well-known that a conjugated diene, a vinyl-substituted aromatic hydrocarbon or a mixture of a conjugated diene and a vinyl-substituted aromatic hydrocarbon can be anionically polymerized by using alkali metals of the Group I in the Periodic Table, such as, lithium, sodium, potassium, etc., or organic compounds of alkali metal as an initiator to form a high polymer. Particularly, a conjugated diene and a vinyl-substituted aromatic hydrocarbon are copolymerized in the presence of an organolithium compound in a hydrocarbon solvent to form a block copolymer consisting of a poly(conjugated diene) block and a poly(vinyl-substituted aromatic hydrocarbon)block. However, when polar compounds, such as, ether, thioether, tertiary amine, are used as one component of the solvent in the above copolymerization, random copolymers are formed, and this process is carried out commercially. In the conjugated diene polymers obtained in the above-mentioned process, it is almost impossible that the microstructure of conjugated diene unit contains trans-1,4-structure of more than 60 percent. Moreover, when organosodium compounds and organopotassium compounds are used as a catalyst, the content of 1,2- or 3,4-structure in the conjugated diene unit reaches about 50 percent.

On the contrary, there has never been hitherto known with respect to homopolymerizations of a conjugated diene, copolymerizations of two or more different conjugated dienes and copolymerizations of a conjugated diene and a vinyl-substituted aromatic hydrocarbon, in which an "Ate-compound" of calcium, strontium or barium according to the present invention is used as a catalyst. The reason presumably lies in that organic compounds of metals of the Group II in the Periodic Table have been considered to be non-effective for the copolymerization. It has not been reported that organic compounds of beryllium, magnesium, zinc or cadmium alone, or mixtures of these compounds can be used as a catalyst for the production of the conjugated diene polymers. Therefore, it is an unexpected new fact that the "Ate-compound" of the present invention can be used as an effective catalyst for the production of the conjugated diene polymers.

The characteristics of the conjugated diene polymers obtained by using a catalyst system of the present invention will be explained hereinafter.

i. Microstructure of homopolymers of a conjugated diene and copolymers of two or more different conjugated dienes:

When the "Ate-compound" of the present invention is used in the polymerization, the microstructure of conjugated diene unit in the resulting polymer has about 70 percent of trans-1,4-structure, about 20 percent of cis-1,4-structure and about 10 percent of 1,2- or 3,4-structure. Such microstructure is considerably different from that of polymers obtained by using organic compounds of alkali metals, such as, lithium, sodium, potassium, etc.

ii. Copolymerizability of a conjugated diene and a vinyl-substituted aromatic hydrocarbon and microstructure of copolymers of said diene and hydrocarbon:

The microstructure of conjugated diene unit is substantially constant independently of the kind of metals constituting the catalyst system as in the above case (i), but the distribution of both monomer units fairly varies depending upon the kind of the metals.

a. "Ate-compound" of calcium:

At the first stage of the polymerization, conjugated diene mainly polymerizes, and as the concentration of the conjugated diene in the reaction system decreases, vinyl-substituted aromatic hydrocarbon mainly polymerizes. That is, the copolymerizability of conjugated diene is considerably higher than that of vinyl-substituted aromatic hydrocarbon.

b. "Ate-compound" of strontium:

The copolymerizability of conjugated diene is higher than that of vinyl-substituted aromatic hydrocarbon as in the above case (a), that is, "Ate-compound" of calcium is used. However, the difference of copolymerizabilities between the two monomeric materials is smaller than the case that "Ate-compound" of calcium is used.

c. "Ate-compound" of barium:

The copolymerizability of conjugated diene is slightly higher than that of vinyl-substituted aromatic hydrocarbon. However, when "Ate-compound" of barium is used, the ratio of vinyl-substituted aromatic hydrocarbon added to the copolymer chain is close to the ratio of vinyl-substituted aromatic hydrocarbon contained in the feed line. Therefore, substantially uniform random copolymers can be obtained.

iii. As seen from the above cases i and ii, when "Ate-compound" of barium is used, uniform random copolymers of a conjugated diene and a vinyl-substituted aromatic hydrocarbon containing about 10 percent of 1,2- or 3,4-structure can be obtained. This is one of the remarkable characteristics of the present invention. For example, it has been known that if the content of 1,2-structure in the butadiene unit in butadiene-styrene copolymer (SBR) decreases, the glass transition temperature Tg of SBR lowers and the physical properties of SBR at low temperature improves. Moreover, the random distribution of styrene units in the copolymer chain can improve the physical property of the butadiene-styrene copolymer as an elastomer together with the improvement of physical property at low temperature due to the above-mentioned low glass transition temperature Tg.

The "Ate-compound" to be used as the catalyst of the present invention has the following general formula $$M^1M^2R^1R^2R^3R^4,$$

wherein $M^1$ is a member selected from the group consisting of calcium, strontium and barium, $M^2$ is a member selected from the group consisting of zinc and cadmium, and $R^1$, $R^2$, $R^3$ and $R^4$ are hydrocarbon radicals selected from the group consisting of aliphatic, cycloaliphatic and aromatic radicals containing from one to ten carbon atoms.

An explanation will be made in order to clarify the meaning of the above-mentioned "Ate-compound".

When alkylmetals having the general formulas

, wherein $M^1$, $M^2$, $R^1$, $R^2$, $R^3$ and $R^4$ have the same meanings as described above, are mixed, they are reacted to form a complex. For example,

is reacted with

to form $Ba^{\ominus\ominus}[ZnR^1R^2R^3R^4]^{\ominus\ominus}$. Thus, zinc is a bivalent metal, but the other two alkyl radicals are coordinated to the zinc to form a zincate anion $Zn[R^1R^2R^3R^4]^{\ominus\ominus}$, which forms ion pair together with $Ba^{\ominus\ominus}$.

Therefore, $BaZn(R)_4$, wherein R has the same meaning as $R^1$, $R^2$, $R^3$ and $R^4$, is not formed directly from $Bs(R)_2$ and $Zn(R)_2$, but metallic barium is dissolved into $RZnR$ to form $BaZn(R)_4$. However, this complex formation reaction proceeds formally in such a manner that two alkyl radicals are additionally coordinated to a normal alkylzinc, for example, $(C_4H_9)Zn(C_4H_9)$ to form a zincate ion, that is, "Ate-complex" $[Zn(C_4b89)_4]^{\ominus\ominus}$, which forms ion pair together with $Ba^{\ominus\ominus}$.

Such "Ate-compound" is defined by G. Wittig (G. Wittig, Angew. Chem. 70(3), 65–71 (1958)). A well-known "Ate-compound" is $LiAlH_4$, wherein one hydrogen atom is coordinated to $AlH_3$ to form $[AlH_4]^{\ominus}$, which forms ion pair together with $Li^{\ominus}$.

Among the thus defined "Ate-compounds" having the general formula $M^1M^2R^1R^2R^3R^4$, ones to be used preferably in the present invention include $CaZn(CH_3)_4$, $CaZn(C_2H_5)_4$, $CaZn(n-C_3H_7)_4$, $CaZn(n-C_4H_9)_4$, $SrZn(CH_3)_4$, $SrZn(C_2H_5)_4$, $SrZn(n-C_3H_7)_4$, $SrZn(n-C_4H_9)_4$, $BaZn(C_2H_5)_4$, $BaZn(n-C_3H_7)_4$, $BaZn(n-C_4H_9)_4$, $BaZn(n-C_5H_{11})_4$, $CaZn(C_6H_5)_4$, $SrZn(C_6H_5)_4$, $BaZn(C_6H_5)_4$, $CaZn(cyclohexyl)_4$, $SrZn(cyclohexyl)_4$, $BaZn(cyclohexyl)_4$, $CaCd(C_2H_5)_4$, $SrCd(C_2H_5)_4$, $BaCd(n-C_4H_9)_4$, $CaZn(C_2H_5)_2(n-C_4H_9)_2$, $SrZn(C_2H_9)_2$, $BaZn(C_2H_5)_2(n-C_4H_9)_2$, etc.

The monomeric material to be used in the present invention is selected from the group consisting of (1) at least one conjugated diene and (2) a mixture of a conjugated diene and a vinyl-substituted aromatic hydrocarbon.

The preferable conjugated diene contains four to 12 carbon atoms per molecule and includes, for example, 1,3-butadiene, isoprene, 1,3-pentadiene, 2,3-dimethyl-1,3-butadiene, 2-methyl-1,3-pentadiene, 2-phenyl-1,3-butadiene and 1-phenyl-1,3-butadiene. Among them, 1,3-butadiene and isoprene are preferable.

The vinyl-substituted aromatic hydrocarbon is a compound having eight to 20 carbon atoms per molecule, wherein at least one vinyl group is attached to carbon atoms of aromatic nucleus, and includes styrene, 1-vinylnaphthalene, 3-vinyltoluene, divinyl-benzene and the like. Among them, styrene is preferable. As the other vinyl-substituted aromatic hydrocarbons, mention may be made of 3,5-diethylstyrene, 4-n-propylstyrene, 2,4,6-trimethylstyrene, 4-phenylstyrene, 4-p-tolylstyrene, 3,5-diphenylstyrene, 3-ethyl-1-vinylnaphthalene, 8-phenyl-1-vinylnaphtalene, etc.

The polymerization of the present invention may be effected by a bulk polymerization process or by a solution polymerization process, but it is necessary that the polymerization system should be completely free from oxygen and water in both cases.

As the solvent, use may be made of aliphatic, alicyclic and aromatic hydrocarbons, and these hydrocarbons containing less than 10 percent by weight of an ether compound having chain or cyclic structure. It is desirable that the hydrocarbon is liquid under usual condition of polymerization reaction, and hydrocarbons having not more than 20 carbon atoms, such as, n-pentane, n-hexane, n-heptane, n-octane, isooctane, cyclohexane, benzene, toluene, xylenes, tetralin, decalin, etc., are preferably used. As the ether compounds, ethyl ether, propyl ether, tetrahydrofuran, 1,4-dioxane, etc., are preferably used.

An amount of the solvent used is usually within a range of 100 – 2,000 parts by weight, preferably, 300 – 1,000 parts by weight based on 100 parts by weight of the monomeric material.

The catalyst is used in a concentration of 0.1 to 100 mmoles, preferably, 0.5 to 50 mmoles per mole of the monomeric material.

The polymerization reaction can be carried out at a temperature within a range of about $-30°$ – $160°$ C., but it is preferable to effect the polymerization within a range of $0°$ – $120°$ C. The polymerization reaction can be effected under a pressure generated autogeneously, but it is preferable to effect the polymerization under a sufficient pressure to maintain the monomeric material in a liquid state. Of course, the polymerization reaction may be effected under high pressure.

An amount of a conjugated diene to be used for production of the conjugated diene copolymers in the present invention can be varied within a broad range, such as, 100 – 10 parts by weight of the conjugated diene based on 100 parts by weight of the total monomeric materials. In another words, an amount of a vinyl-substituted aromatic hydrocarbon used can be varied within a range of 0 – 90 parts by weight. However, in order to produce copolymers of a conjugated diene and a vinyl-substituted aromatic hydrocarbon having an excellent property to be used for elastomer, it is preferable that the amount of vinyl-substituted aromatic hydrocarbon in the copolymer is less than 50 percent.

The rubbery copolymers obtained in a proper composition of both monomeric materials can be compounded with natural rubber and the like in a conventional means. This rubbery copolymer can be molded into a final product by means of a compression molding or an extrusion molding, and can be used for the production of car tire, gasket, container, sheet and the like.

The invention will be explained in more detail by the following Examples. In all Examples, total monomers are 100 mmoles and "part" and "percent" mean by weight.

EXAMPLES 1 – 3

A beverage bottle of 100 ml capacity was dried completely and air in the bottle was substituted with purified nitrogen three times. The bottle was charged with 400 parts of dried cyclohexane and 25 parts of styrene by means of an injector, and cooled to $-78°$ C. The bottle was further charged with 75 parts of 1,3-butadiene and a predetermined amount of the catalyst shown in the following Table 1, and then sealed. The bottle was placed in a thermostat at 50° C. provided with a rotating frame and rotated for a predetermined period of time to effect polymerization. The polymerization mixture was added to a large amount of 2 percent solution of phenyl-$\beta$-naphthylamine in ethanol to stop the polymerization reaction, and the precipitated copolymer was separated and dried at 50° C. under vacuum.

Control experiments were carried out in the same manner as described above, except that $Mg(C_4H_9)_2$ and $Zn(C_2H_5)_2$ were used respectively, which were Comparative Examples 1 and 2.

The obtained result is shown in the following Table 1. In these copolymerization reactions, the total amount of butadiene and styrene was 100 mmoles.

TABLE 1

| Example number | Catalyst | | Polymerization time (min.) | Yield (percent) | Intrinsic viscosity [η] | Styrene content (percent) | Microstructure of butadiene unit | | |
|---|---|---|---|---|---|---|---|---|---|
| | Kind | Amount (mmol) | | | | | Trans-1,4 (percent) | 1,2 (percent) | Cis-1,4 (percent) |
| 1 | $BaZn(C_4H_9)_4$ | 1 | 90 | 46 | 0.24 | 20.1 | 70.0 | 11.1 | 18.9 |
| 2 | $SrZn(C_2H_5)_4$ | 1 | 50 | 59 | 0.31 | 10.8 | 70.4 | 9.5 | 20.1 |
| 3 | $CaZn(C_2H_5)_4$ | 1 | 50 | 45 | 0.28 | 5.1 | 77.2 | 9.9 | 12.9 |
| Comparative example 1 | $Mg(C_4H_9)_2$ | 2 | 1,200 | 0 | | | | | |
| Comparative example 2 | $Zn(C_2H_5)_2$ | 2 | 1,200 | 0 | | | | | |

In the above Table 1, the intrinsic viscosity was determined at 30° C. in toluene. The intrinsic viscosity described in the following Examples was measured under the same condition.

The microstructure of 1,3-butadiene unit and styrene content in the copolymer were analyzed in the following procedure by the use of infrared spectrophotometer.

The intensity of infrared spectrum is shown by the following formula 1 according to Lambert-Beer's law.

$$I = I_o e^{-kct} \quad (1)$$

, wherein $I$ : intensity of infrared ray after passed through a sample
$I_o$ : intensity of infrared ray before passing through the sample
$k$ : extinction coefficient of the sample
$c$ : concentration of the sample
$t$ : cell thickness.

With respect to the absorption bands at 967 cm$^{-1}$ in trans-1,4 bond of butadiene unit, at 910 cm$^{-1}$ in 1.2 bond and at 700 cm$^{-1}$ in styrene, each extinction coefficient was calculated from a model substance by means of a 402G grating infrared spectrophotometer made by Nippon Bunko K.K. The formula 1 is modified to obtain the following formula 2

$$D = \log I_o/I = kct \quad (2)$$

Therefore, the concentrations of trans-1,4 bond, 1,2 bond and styrene can be easily calculated from the cell thickness t, the measured value of the absorbance D and the above-described extinction coefficient. The concentration of cis-1,4 bond is determined by subtracting the concentrations of trans-1,4 bond, vinyl bond and styrene from the concentration of the sample.

The microstructure of 1,3-butadiene unit and styrene content described in the present invention are defined as follows:

$$\text{cis-1,4 content (\% by weight)} = \frac{Cc}{Ct + Cv + Cc} \times 100$$

$$\text{trans-1,4 content (\% by weight)} = \frac{Ct}{Ct + Cv + Cc} \times 100$$

$$\text{1,2 (vinyl) content (\% by weight)} = \frac{Cv}{Ct + Cv + Cc} \times 100$$

$$\text{styrene content (\% by weight)} = \frac{Cst}{Ct + Cv + Cc + Cst} \times 100$$

, wherein

Ct : concentration of trans-1,4 bond in the copolymer determined by infrared analysis
Cv : concentration of 1,2(vinyl) bond in the copolymer determined by infrared analysis
Cc : concentration of cis-1,4 bond in the copolymer determined by infrared analysis
Cst : concentration of styrene bond in the copolymer determined by infrared analysis The measurement of infrared spectrum was effected by dissolving a copolymer sample in carbon disulfide and using a cell of the solution having a thickness of 0.5 mm.

When styrene contents of copolymers produced in various feed ratios of styrene are determined by the use of the above-described infrared analysis, the obtained styrene content agreed very well with the theoretical styrene content in the case that the conversion is assumed to be 100 percent.

The microstructure of polybutadiene also was analyzed quantitatively in the exactly same procedure.

Table 1 shows that even when metals of the Group II in the Periodic Table are used, "Ate-compounds" of barium, strontium and calcium can polymerize a mixture of 1,3-butadiene and styrene, but Mg-alkyl and Zn-alkyl cannot initiate the polymerization reaction.

Furthermore, it can be seen from the comparison of styrene contents of copolymers obtained in about 50 percent conversion that when BaZn(C$_4$H$_9$)$_4$ produces a copolymer, the styrene content of which is close to the feed line (25 percent), CaZn(C$_2$H$_5$)$_4$ produces a copolymer, in which 1,3-butadiene is mainly polymerized at the first stage of the copolymerization reaction, and SrZn(C$_2$H$_5$)$_4$ produces a copolymer having an intermediate property. The microstructure of butadiene unit is not highly influenced by the kind of metals, and its trans-1,4 content is high.

Examples 4 – 6

A beverage bottle of 100 ml capacity was dried completely and air in the bottle was substituted with purified nitrogen three times. The bottle was charged with 400 parts of toluene and 25 parts of styrene by means of an injector, and cooled to −78° C. The bottle was further charged with 75 parts of 1,3-butadiene and 0.9 mmole of the catalyst as shown in the following Table 2, and then sealed. The bottle was placed in a thermostat kept at 70° C. and rotated to effect polymerization.

The obtained result is shown in the following Table 2.

TABLE 2

| Example number | Catalyst | Polymerization time (min.) | Yield (percent) | Intrinsic viscosity [η] | Styrene content (percent) | Microstructure of butadiene unit | | |
|---|---|---|---|---|---|---|---|---|
| | | | | | | Trans-1,4 (percent) | 1,2 (percent) | Cis-1,4 (percent) |
| 4 | BaZn(C$_4$H$_9$)$_4$ | 300 | 95.0 | 0.47 | 22.7 | 70.5 | 7.8 | 21.7 |
| 5 | SrZn(C$_2$H$_5$)$_4$ | 300 | 97.3 | 0.30 | 19.9 | 70.8 | 7.8 | 21.4 |
| 6 | CaZn(C$_2$H$_5$)$_4$ | 300 | 82.7 | 0.41 | 10.3 | 74.8 | 9.2 | 16.0 |

Examples 7 – 9

In these examples, copolymerization reactions were effected in the same manner as recipe as described in Example 4, except that n-hexane was used as a solvent and the polymerization time was 20 hours, to obtain a result as shown in the following Table 3.

TABLE 3

| Example number | Catalyst | Yield (percent) | Intrinsic viscosity [η] | Styrene content (percent) | Microstructure of butadiene unit | | |
|---|---|---|---|---|---|---|---|
| | | | | | Trans-1,4 (percent) | 1,2 (percent) | Cis-1,4 (percent) |
| 7 | BaZn(C$_4$H$_9$)$_4$ | 94.0 | 0.62 | 21.3 | 66.7 | 7.4 | 25.9 |
| 8 | SrZn(C$_2$H$_5$)$_4$ | 94.0 | 0.32 | 21.1 | 70.1 | 9.4 | 20.5 |
| 9 | CaZn(C$_2$H$_5$)$_4$ | 88.1 | 0.42 | 15.7 | 73.0 | 9.0 | 18.0 |

EXAMPLE 10

In this Example, a copolymerization reaction was effected in the same manner and recipe as described in Example 1, except that 400 parts of cyclohexane containing 5 percent of tetrahydrofuran were used as a solvent, and 1 mmole of BaZn(C$_4$H$_9$)$_4$ was used as a catalyst at 50° C. for 90 minutes, to obtain a copolymer in a yield of 61 percent. In the copolymer, styrene content was 15.6 percent, the microstructure of butadiene unit contained 70.0 percent of trans-1,4, 9.6 percent of 1,2 and 20.4 percent of cis-1,4. It was found that when a small amount of tetrahydrofuran is contained in cyclohexane, the activity of the catalyst of the invention increases somewhat, but the copolymerizability of styrene decreases somewhat.

Furthermore, when cyclohexane containing a small amount of ethylether, propylether or 1,4-dioxane used as a solvent, the similar results were obtained.

EXAMPLE 11

A copolymerization reaction was effected in the same manner and recipe as described in Example 1, except that 1 mmole of $BaZn(C_2H_5)_2(C_4H_9)_2$ catalyst was used at 50° C. for 120 minutes, to obtain a copolymer in a yield of 73 percent. In this copolymer, the styrene content was 20.5 percent and the microstructure of butadiene unit contained 69.2 percent of trans-1,4, 9.0 percent of 1,2 and 21.8 percent of cis-1,4.

EXAMPLE 12

A copolymerization reaction was effected in the same manner and recipe as described in Example 1, except that 1 mmole of $BaZn(C_6H_5)_4$ catalyst was used at 50° C. for 300 minutes, to obtain a copolymer in a yield of 77 percent. In this copolymer, the styrene-content was 21.0 percent and the microstructure of butadiene unit contained 70.1 percent of trans-1,4, 9.3 percent of 1,2 and 20.6 percent of cis-1,4.

EXAMPLE 13

A copolymerization reaction was effected in the same manner and recipe as described in Example 1, except that 1 mmole of $BaCd(C_2H_5)_4$ catalyst was used at 50° C. for 100 minutes, to obtain a copolymer in a yield of 67 percent. In this copolymer, the styrene content was 20.2 percent and the microstructure of butadiene unit contained 68.8 percent of trans-1,4, 7.8 percent of 1,2 and 21.7 percent of cis-1,4.

EXAMPLE 14

A copolymerization reaction was effected in the same manner and recipe as described in Example 1, except that a mixture of 50 mmoles of styrene and 50 mmoles of isoprene was used as a monomeric material and copolymerized at 50° C. for 300 minutes in the presence of 1 mmole of $BaZn(C_4H_9)_4$ catalyst, to obtain a copolymer in a yield of 80 percent. This copolymer had an intrinsic viscosity of 0.12.

EXAMPLE 15

A copolymerization reaction was effected in the same manner and recipe as described in Example 1, except that a mixture of 50 mmoles of butadiene and 50 mmoles of isoprene was used as a monomeric material and copolymerized at 50° C. for 300 minutes in the presence of $BaZn(C_4H_9)_4$ catalyst, to obtain a copolymer in a yield of 79 percent. This copolymer had an intrinsic viscosity of 0.32.

EXAMPLES 16 – 18

In these examples, polymerization reactions were effected in the same manner and recipe as described in Example 4, except that butadiene were used as a monomeric material and homopolymerized in the presence of 1.5 mmoles of catalysts.
The obtained result is shown in Table 4.

TABLE 4

| Example number | Catalyst | Yield (percent) | Intrinsic viscosity $[\eta]$ | Microstructure of butadiene unit (percent) | | |
|---|---|---|---|---|---|---|
| | | | | trans-1,4 | 1,2 | Cis-1,4 |
| 16 | $BaZn(C_4H_9)_4$ | 92.0 | 0.65 | 69.3 | 10.5 | 20.2 |
| 17 | $SrZn(C_2H_5)_4$ | 88.9 | 0.50 | 73.6 | 8.2 | 18.2 |
| 18 | $CaZn(C_2H_5)_4$ | 82.1 | 0.63 | 76.0 | 8.7 | 15.3 |

EXAMPLES 19 – 21

In these examples, polymerization reactions were effected in the same manner and recipe as described in Example 4, except that isoprene were used as a monomeric material and homopolymerized in the presence of 0.3 mmole of catalysts.
The obtained result is shown in Table 5.

TABLE 5

| Ex. No. | Catalyst | Yield (%) | Intrinsic viscosity $[\eta]$ |
|---|---|---|---|
| 19 | $BaZn(C_4H_9)_4$ | 100.0 | 0.44 |
| 20 | $SrZn(C_2H_5)_4$ | 100.0 | 0.34 |
| 21 | $CaZn(C_2H_5)_4$ | 100.0 | 0.33 |

EXAMPLES 22 – 36

In these examples, copolymerization reactions were effected in the same manner as described in Example 1, except that a mixture of 55 parts of 1,3-butadiene and 45 parts of styrene was used as a monomeric material and copolymerized at 60° C. in the presence of 0.5 mmole of a catalyst.
The obtained result is shown in Table 6.

TABLE 6

| Example number | Catalyst | Polymerization time (min.) | Yield (percent) | Styrene content (percent) | Microstructure of butadiene unit | | |
|---|---|---|---|---|---|---|---|
| | | | | | Trans-1,4 (percent) | 1,2 (percent) | Cis-1,4 (percent) |
| 22 | $BaZn(C_4H_9)_4$ | 20 | 5.0 | 32.4 | 63.9 | 9.2 | 26.9 |
| 23 | $BaZn(C_4H_9)_4$ | 30 | 12.2 | 31.6 | 64.4 | 7.9 | 27.7 |
| 24 | $BaZn(C_4H_9)_4$ | 50 | 20.6 | 32.2 | 63.3 | 8.1 | 28.6 |
| 25 | $BaZn(C_4H_9)_4$ | 90 | 47.2 | 33.6 | 62.7 | 7.9 | 29.5 |
| 26 | $BaZn(C_4H_9)_4$ | 1,600 | 95.4 | 41.7 | 59.8 | 8.0 | 32.2 |
| 27 | $SrZn(C_2H_5)_4$ | 15 | 10.4 | 14.4 | 70.0 | 8.0 | 22.0 |
| 28 | $SrZn(C_2H_5)_4$ | 25 | 34.8 | 18.3 | 70.1 | 6.9 | 23.0 |
| 29 | $SrZn(C_2H_5)_4$ | 35 | 52.3 | 27.7 | 74.0 | 7.7 | 18.3 |
| 30 | $SrZn(C_2H_5)_4$ | 90 | 75.5 | 36.8 | 69.8 | 7.6 | 22.6 |
| 31 | $SrZn(C_2H_5)_4$ | 1,600 | 95.4 | 42.2 | 68.2 | 7.6 | 24.2 |
| 32 | $CaZn(C_2H_5)_4$ | 30 | 11.7 | 9.2 | 74.8 | 11.2 | 14.0 |
| 33 | $CaZn(C_2H_5)_4$ | 50 | 19.2 | 12.5 | 69.7 | 13.5 | 16.8 |
| 34 | $CaZn(C_2H_5)_4$ | 60 | 25.8 | 10.9 | 74.2 | 11.4 | 14.4 |
| 35 | $CaZn(C_2H_5)_4$ | 70 | 27.0 | 10.9 | 74.8 | 10.9 | 14.4 |
| 36 | $CaZn(C_2H_5)_4$ | 90 | 40.0 | 15.8 | 73.9 | 10.6 | 15.5 |

In can be seen from Table 6 that $BaZn(C_4H_9)_4$ produces a copolymer, the styrene content of which is close to the feed line (45 percent), $CaZn(C_2H_5)_4$ produces a copolymer, in which 1,3-butadiene is mainly polymerized at first stage of the copolymerization reaction, and $SrZn(C_2H_5)_4$ produces a copolymer having an intermediate property.

EXAMPLES 37 – 39

In these examples, copolymerization reactions were effected in the same manner as described in Example 1, except that a mixture of 70 parts of 1,3-butadiene and 30 parts of styrene was used as a monomeric material and polymerized at 52° C.
The obtained result is shown in the following Table 7.

TABLE 7

| Example Number | Catalyst | | Polymerization time (min.) | Yield (percent) | Styrene content (percent) | Microstructure of butadiene unit | | |
|---|---|---|---|---|---|---|---|---|
| | Kind | Amount (mmol) | | | | trans-1,4 (percent) | 1,2 (percent) | cis-1,4 (percent) |
| 37 | $BaZn(C_4H_9)_4$ | 1.0 | 60 | 26.2 | 20.9 | 64.6 | 8.5 | 26.9 |
| 38 | $SrZn(C_2H_5)_4$ | 1.0 | 60 | 78.5 | 21.6 | 74.7 | 8.0 | 17.3 |
| 39 | $CaZn(C_2H_5)_4$ | 0.5 | 145 | 28.5 | 7.2 | 74.5 | 11.1 | 14.4 |

EXAMPLE 40

A copolymerization reaction was effected in the same manner as described in Example 1, except that a mixture of 90 parts of 1,3-butadiene and 10 parts of p-vinyltoluene was used as a monomeric material, and polymerized at 60° C. for 280 minutes in the presence of 0.7 mmole of $BaZn(C_4H_9)_4$ catalyst, to obtain a copolymer in a yield of 74.5 percent. It was confirmed from infrared absorption spectrum that p-vinyltoluene was copolymerized.

EXAMPLE 41

A beverage bottle of 100 ml capacity was dried completely and air in the bottle was substituted with purified nitrogen three times. The bottle was charged with 400 parts of dried cyclohexane and 25 parts of styrene by means of an injector, and cooled to −78° C. The bottle was further charged with 75 parts of 1,3-butadiene and 0.3 mmole of $BaZn(C_4H_9)_4$, and then sealed. The bottle was placed in a thermostat at 60° C. provided with a rotating frame and rotated for 20 hours to effect polymerization. The polymerization mixture was added to a large amount of 2 percent solution of phenyl-$\beta$-naphthylamine in ethanol to stop the polymerization reaction, and the precipitated copolymer was separated and dried at 50° C under vacuum. The resulting copolymer was colorless and extremely rubber-like.

The obtained result is shown in the following Table 8.

TABLE 8

| | |
|---|---|
| Yield (%) | 91.5 |
| Styrene content (%) | 24.0 |
| Trans-1,4 (%) | 68.0 |
| 1,2 (%) | 7.4 |
| Cis-1,4 (%) | 24.6 |
| Recovery of oxidative degradation product (%) | 0 |
| Glass transition temperature (°C) by DSC method | −72 |

In order to determine the random property of the copolymer obtained in the present invention, the randomness of styrene chain was calculated from the recovery of polystyrene according to the following oxidative degradation method.

This oxidative degradation was effected according to a method disclosed by I.M. Kolthoff, in which osmium tetroxide and tert-butyl hydroperoxide are used (Journal of Polymer Science, Vol. 1, page 429 (1946)). That is, when the copolymer of the present invention is oxidatively degraded by the use of osmium tetroxide catalyst and tert-butyl hydroperoxide, only butadiene unit is degraded and styrene unit remains undecomposed. When the degraded styrene chain has a polymerization degree of less than about 5, the styrene chain is soluble in methanol, while when the degraded styrene chain has a polymerization degree of more than about 5, the styrene chain is insoluble in methanol. Thus, the randomness of the copolymer can be determined from the recovery of styrene chain insoluble in methanol.

The term "recovery of styrene chain" herein means "weight percentage of styrene chain recovered as insoluble part through oxidative degradation of the copolymer" based on the total styrene content in the copolymer before the oxidative degradation.

In the copolymer obtained in this Example 41, the recovery after oxidative degradation is 0 percent, which shows that the copolymer is a random copolymer containing no long styrene chains.

Furthermore, the glass transition temperature Tg of this copolymer is −72°C, which is considerably lower than that (Tg=−56) of commercially available SBR obtained by emulsion polymerization.

What is claimed is:

1. A process for preparing conjugated diene polymers consisting essentially of contacting a monomeric material selected from the group consisting of (1) at least one conjugated diene having four–12 carbon atoms and (2) a mixture of a conjugated diene having four–12 carbon atoms and styrene, the amount of said styrene being 0 – 90 parts by weight based on 100 parts by weight of the total monomeric materials, at a temperature in the range of −30° to 160° C, in the presence of aromatic hydrocarbon solvent selected from the group consisting of benzene, toluene, xylene and tetralin in the absence of oxygen and water with a catalyst consisting essentially of an "Ate-compound" having the following formula:

$$M^1 M^2 R^1 R^2 R^3 R^4$$

wherein $M^1$ is a member selected from the group consisting of calcium, strontium and barium, $M^2$ is zinc, $R^1$, $R^2$, $R^3$ and $R^4$ are aliphatic hydrocarbon radicals containing from one to ten carbon atoms, the amount of said catalyst being in the range of 0.1 to 100 millimoles per mole of said monomeric material.

2. A process according to claim 1, wherein said monomeric material is 1,3-butadiene.

3. A process according to claim 1, wherein said monomeric material is isoprene.

4. A process according to claim 1, wherein said monomeric material is a mixture of 1,3-butadiene and styrene.

5. A process according to claim 1, wherein said catalyst is bariumzinctetrabutyl.

6. A process according to claim 1, wherein said catalyst is strontiumzinctetraethyl.

7. A process according to claim 1, wherein said catalyst is calciumzinctetraethyl.

8. A process according to claim 1, wherein the amount of said catalyst is in the range of 0.5 to 50 millimoles per mole of said monomeric material.

* * * * *